United States Patent [19]

Taylor et al.

[11] Patent Number: 5,543,964
[45] Date of Patent: Aug. 6, 1996

[54] DEPTH IMAGE APPARATUS AND METHOD WITH ANGULARLY CHANGING DISPLAY INFORMATION

[75] Inventors: Roy Y. Taylor, Scottsville; William A. Doty, Holley; David J. Kroth, N. Chili; Roland R. Schindler, Pittsford, all of N.Y.

[73] Assignee: Eastman Kodak Company, Rochester, N.Y.

[21] Appl. No.: 174,657

[22] Filed: Dec. 28, 1993

[51] Int. Cl.$^6$ .................................................. G02B 27/22
[52] U.S. Cl. .......................... 359/463; 359/478; 359/462
[58] Field of Search ................................ 359/462, 463, 359/466, 467, 478

[56] References Cited

U.S. PATENT DOCUMENTS

| | | | |
|---|---|---|---|
| 2,815,310 | 12/1957 | Anderson | 156/64 |
| 3,154,872 | 11/1964 | Nordgren | 40/615 |
| 3,692,312 | 9/1972 | Meyer | 273/157 R |
| 3,704,068 | 11/1972 | Waly | 355/46 |
| 3,772,976 | 11/1973 | Stroke | 354/77 |
| 3,907,420 | 9/1975 | Yevich | 353/121 |
| 3,922,074 | 11/1975 | Ikegami et al. | 380/3 |
| 4,092,654 | 5/1978 | Alasia | 354/112 |
| 4,094,596 | 6/1978 | Waly | 353/27 R |
| 4,135,502 | 1/1979 | Peck | 351/203 |
| 4,305,095 | 12/1981 | Dallas | 358/88 |
| 4,346,962 | 8/1982 | Holmes, Jr. | 359/463 |
| 4,562,463 | 12/1985 | Lipton | 348/56 |
| 4,677,481 | 6/1987 | Nicholas | 348/184 |
| 4,709,263 | 11/1987 | Brumage | 348/42 |
| 4,740,073 | 4/1988 | Meacham | 352/58 |
| 4,754,327 | 6/1988 | Lippert | 358/88 |
| 4,807,965 | 2/1989 | Garakani | 359/464 |
| 4,841,292 | 6/1989 | Zeno | 345/121 |
| 4,853,769 | 8/1989 | Kollin | 358/88 |
| 4,896,210 | 1/1990 | Brokenshire et al. | 348/51 |
| 4,920,039 | 4/1990 | Fotland et al. | 430/324 |
| 4,935,335 | 6/1990 | Fotland | 430/324 |
| 4,944,572 | 7/1990 | Young | 359/619 |
| 4,956,705 | 9/1990 | Wright | 358/88 |
| 4,959,641 | 9/1990 | Bass et al. | 359/462 |
| 4,965,665 | 10/1990 | Amir | 358/101 |
| 4,987,487 | 1/1991 | Ichinose et al. | 358/92 |
| 4,999,006 | 3/1991 | Hamanaka | 359/559 |
| 5,014,126 | 5/1991 | Pritchard et al. | 358/91 |
| 5,049,987 | 9/1991 | Hoppenstein | 358/88 |
| 5,067,167 | 11/1991 | Berger | 382/46 |
| 5,083,199 | 1/1992 | Börner | 358/88 |
| 5,099,320 | 3/1992 | Allio | 358/88 |
| 5,101,268 | 3/1992 | Ohba | 358/88 |
| 5,101,442 | 3/1992 | Amir | 382/41 |
| 5,113,213 | 5/1992 | Sandor et al. | 355/22 |

*Primary Examiner*—Paul M. Dzierzynski
*Assistant Examiner*—Darren E. Schuberg
*Attorney, Agent, or Firm*—Gordon M. Stewart

[57] ABSTRACT

An apparatus and method of creating depth images with different depth image scenes being projected at different viewer orientations. At each of the orientations a different perspective series is provided to the viewer. To provide the different depth scenes at the different orientations, different depth content image slices of different depth content scenes are interleaved behind lenticules of a lenticular faceplate. The interleaving of different depth content scenes on an imaging substrate is accomplished by writing to a print file depth images of the different depth content scenes in successive positions prior to driving the printer with the print file contents to record on the substrate. The substrate is then attached to the lenticular faceplate.

10 Claims, 7 Drawing Sheets

DEPTH IMAGE APPARATUS AND METHOD WITH ANGULARLY CHANGING DISPLAY INFORMATION

CROSS REFERENCES TO RELATED APPLICATIONS

This application is related to U.S. application having Ser. No. 07/722,713 and entitled Electronically Interpolated Integral Photography System and to U.S. application having Ser. No. 07/885,706 and entitled Method And Apparatus For Graphically Generating Images 0f Arbitrary Size both incorporated by reference herein.

BACKGROUND OF THE INVENTION

1. Field of the Invention

The present invention is directed to a method and apparatus for creating depth images that have changing display information and, more particularly to depth images in which display information, distinct from the normal depth/look around display information, appears and disappears as the perspective of the viewer changes.

2. Description of the Related Art

Figure 1:
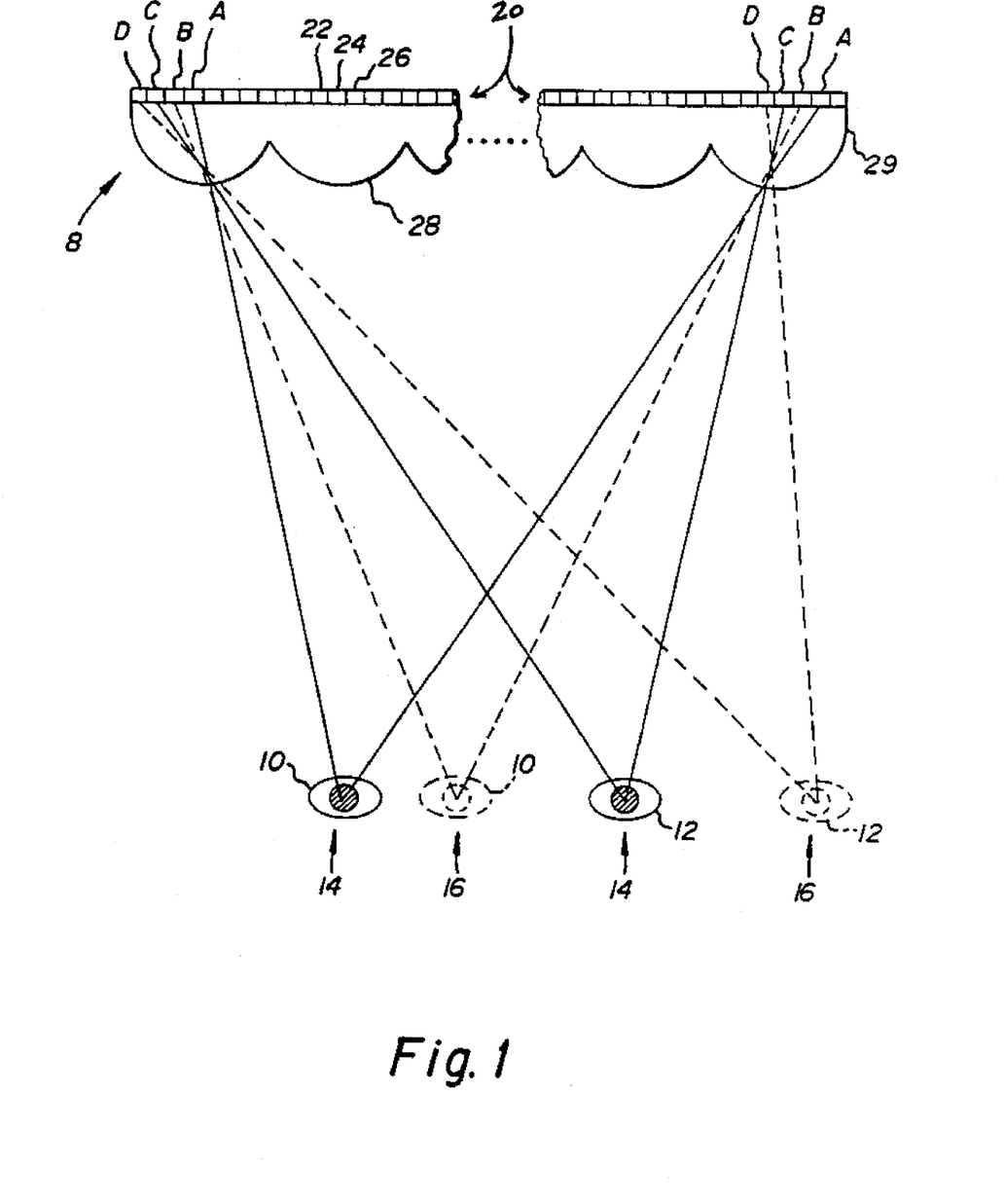
FIG. 1 depicts interleaving of image slices 22,24,26 of images of a scene from different viewpoints to create a depth image using a lenticular faceplate 29 of lenticules 28 which allows a viewer to see different views of the scene from different positions 14 and 16.

Conventional depth images provide the viewer with a sense of depth which is some times called binocular stereopsis. Conventional depth image displays, either of the lenticular or barrier type, because a stereo effect is being provided, present sightly different scene information to the viewer as the viewer's head moves in a horizontal direction in front of the depth image. This effect called a look around effect occurs because each eye is presented with a different image or view of the scene and as the position of the eye moves relative to the depth image the view presented to each eye changes. This is shown in the lenticular photograph type depth image 8 illustrated in FIG. 1. In this figure when the eyes 10 and 12 of a viewer are in position 14 the viewer sees the image slices from scenes A and C respectively as illustrated by the solid lines. The A scene is a view slice of the scene from a viewpoint to the left of the viewpoint of scene C. When the viewer's eyes 10 and 12 move to position 16 the image slices seen by each eye change. As depicted by the dashed lines the left eye sees image slices from scene B and the right eye sees slices from scene D. When the viewpoint of the scene A is to the left of the viewpoint of scene B, B is to the left of C and C is to the left of D, as the viewers' head moves, the viewer will see progressively different viewpoints of the scene. Because the mind of the viewer fuses the slices of the same scene reaching each eye the viewer senses depth in the photograph being viewed. If the different viewpoints of the scene gradually expose a hidden object, the viewer experiences the ability to look around objects in the depth photograph. This experience of depth is provided even though the lenticular photograph 8 is a generally planar object. The ability of the lenticular photograph to provide different image slices to the eye is possible because an image substrate 20 includes adjacently recorded image slices 22, 24, 26, etc. each of which is projected in a different direction by the cylindrically shaped lenses, called lenticules 28, which are part of the lenticular faceplate 29 positioned in front of the substrate 20. In barrier type depth images a barrier strip faceplate is substituted for the lenticular faceplate. Additional information on the background and the theory of depth images can be obtained from Okoshi, Three-Dimensional Imaging Techniques, 1976 published by Academic Press. Conventional depth images, such as those discussed above, present the viewer with images from the same scene with changes in image information being limited to changes in content being provided by different viewpoints of the same scene.

Lenticular viewing devices currently exist in which the information presented changes as the viewpoint of the lenticular object changes. These objects, typified by lenticular baseball cards and prizes found in boxes of caramel coated nuts and popcorn, present the viewer with different pictures of different scenes as the vertical viewpoint changes. For example, from one viewpoint the viewer would see a picture of a baseball player and from a different vertical viewpoint the viewer would see a picture of a different baseball player. These pictures are planar pictures with no sense of depth being provided.

What is needed is a depth image that radically changes the information provided to the viewer as the viewpoint changes horizontally while the sense of realism or depth is preserved.

SUMMARY OF THE INVENTION

It is an object of the present invention to provide a depth image in which information in addition to the conventional depth information changes as the viewer's head changes position.

It is another object of the present invention to provide a depth image in which information not related to the depth image scene can be provided to the viewer from different viewpoint orientations.

It is a further object of the present invention to provide an image sequence of gradually changing display information, either temporal or spatial, unrelated to the depth content in conjunction with sufficient information being presented in each successive horizontal image to enable binocular stereopsis or depth perception in a viewer when positioned at one or more possible horizontal viewing locations in the viewing space.

It is also an object of the present invention to present such changing information as photographically captured images or computer generated graphics or text which is superimposed on view perspective changing information to be concurrently visible at one or more possible locations in the viewing space.

It is an object of the present invention to provide depth images with dissimilar information being compiled from two or more distinct sources of image sequences with sufficient information being retained to provide the viewer with a sense of depth or binocular stereopsis at one or more locations in the viewing space.

It is another object of the present invention to provide a depth image that provides the viewer with animation of a scene as the viewer changes horizontal head position while maintaining a sense of depth or binocular stereopsis.

It is a still further object of the present invention to provide multiple depth images from the same image space.

The above objects can be attained by a method of capturing or generating scenes with different depth content. Different depth content image slices of the different depth content scenes are provided in successive locations behind each lenticule of a lenticular faceplate by interleaving. The interleaving of different depth content scenes on an imaging substrate is accomplished by creating depth images of the different depth content scenes and then interleaving the different content scenes in a print file prior to recording on a substrate.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Conventional electronically printed lenticular photographs are printed hardcopy images that change in appearance with viewer orientation to the display. In these conventional applications of the technology, the changing viewing perspective of a single static image scene enables stereopsis by the viewer with a look around effect which creates an experience analogous to viewing the real world. The present invention, in contrast to this conventional technology, radically changes the information or content of the image seen by the viewer at different angular locations, display bands or display spaces within the display angle of a lenticular faceplate of a lenticular photograph while maintaining the viewer's perception of depth or the stereopsis effect. By the method and apparatus described herein animation or graphics or different images can be made to appear to the viewer at specific different viewing orientations.

Figure 2:
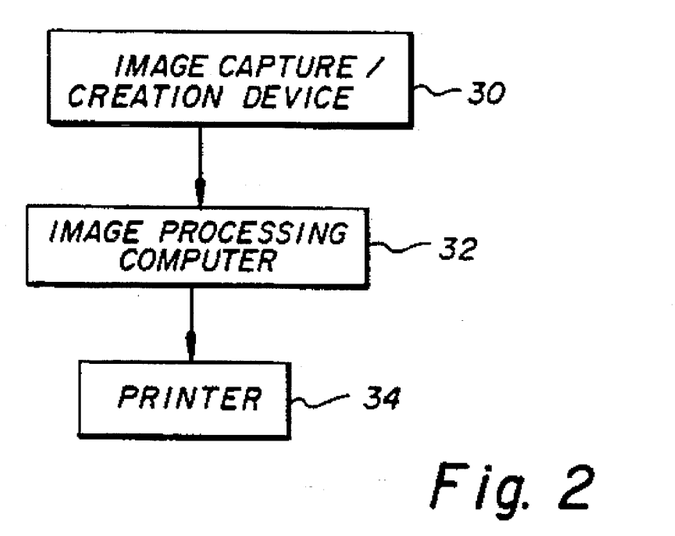
FIG. 2 depicts the hardware components of the present invention.

As illustrated in FIG. 2, the present invention includes an image capture or creation device 30 which photographically, electronically or graphically produces digital images of scenes from different viewpoints. These digital images are provided to an image processing computer 32 which combines the images, as described in more detail hereinafter, into a composite print file which provides different content depth images from different view orientations of the lenticular photograph. The print file is provided to a high resolution printer 34 which records the combined images on a recording medium substrate, such as a film transparency material. Once the recording is completed the medium is developed and a lenticular faceplate is attached to the substrate. The details of capturing or creating images which are combined to produce a lenticular photograph are described in detail in the related applications previously mentioned. Other recording or display media such as a CRT can of course be substituted for the film.

Figure 3:
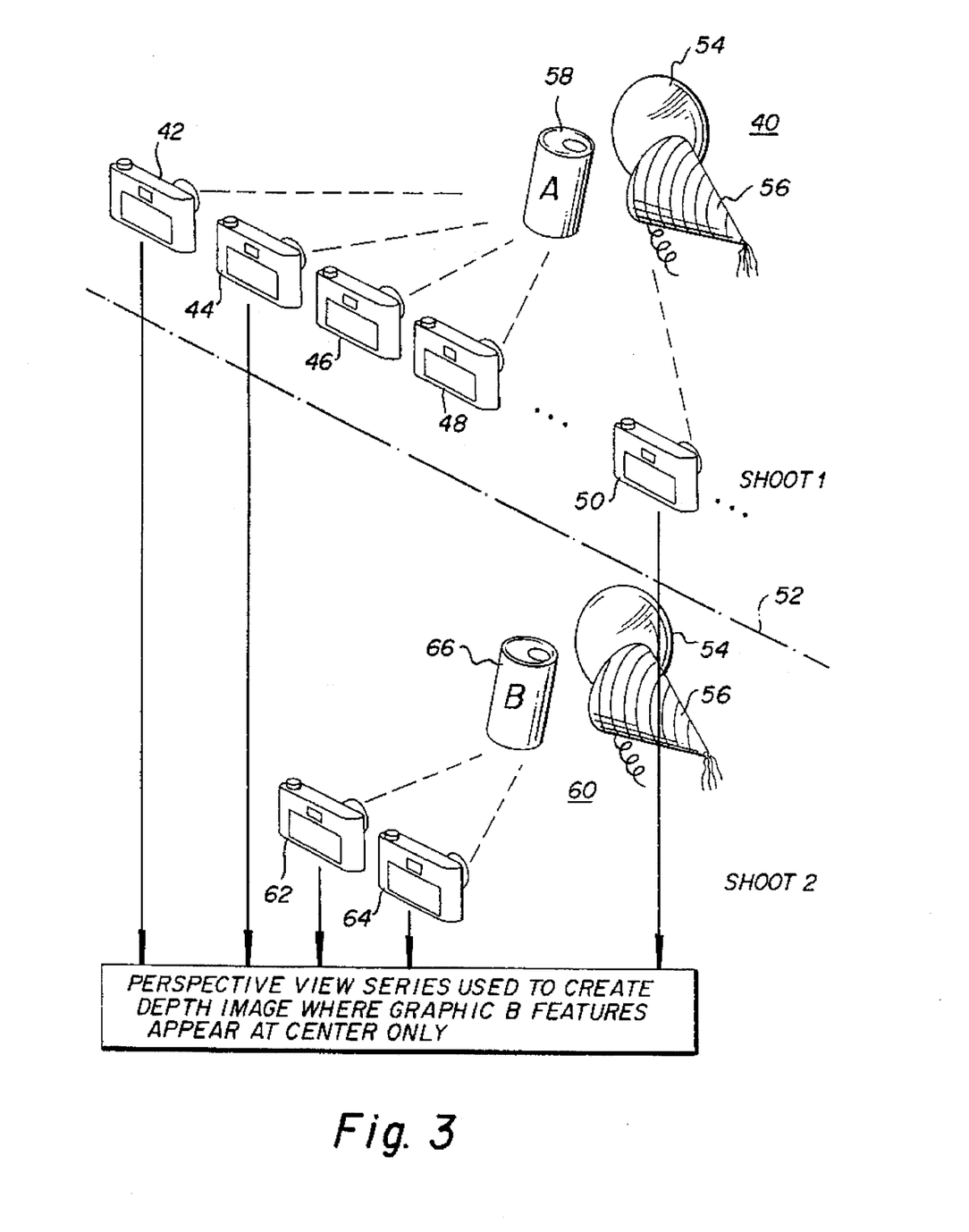
FIG. 3 illustrates the capture of first and second perspective view series of first 40 and second 60 scenes.

To provide different depth images to the viewer from different lenticular photograph viewing orientations, different perspective view series must be captured (or created) as illustrated in FIG. 3. As illustrated, several perspective images of a first scene 40 from different viewpoints are captured as a first view series by capture devices 42, 44, 46, 48 and 50 arranged along a capture axis 52. This first scene 40 includes scene objects, such as a balloon 54, a party hat 56 and a beverage can 58. The can 58 includes can graphic "A" which of course could be of one color, such as red. A second scene 60 is captured from different viewpoints by additional capture devices 62 and 64 to create a second view series. The additional capture devices are arranged along the capture axis 52 although such is not directly shown in FIG. 3. The second series includes the balloon 54, the hat 56 and a different can 66 which includes a different graphic "B" which could be of a different color, such as green. By properly interleaving image slices from the different view perspectives and the different scenes, a depth image can be created which provides a depth image of the first can 58 to the viewer from a first lenticular photograph view orientation and provides a depth image of the second can 66 to the viewer from a second orientation. Although FIG. 3 shows capturing three view series so that the scene 60 appears in the center of the angular display with scene 40 being visible from angular perspectives on either side of the center, the first example of image and view slice interleaving will use two scenes which can be seen from two different angular orientations.

Figure 4:
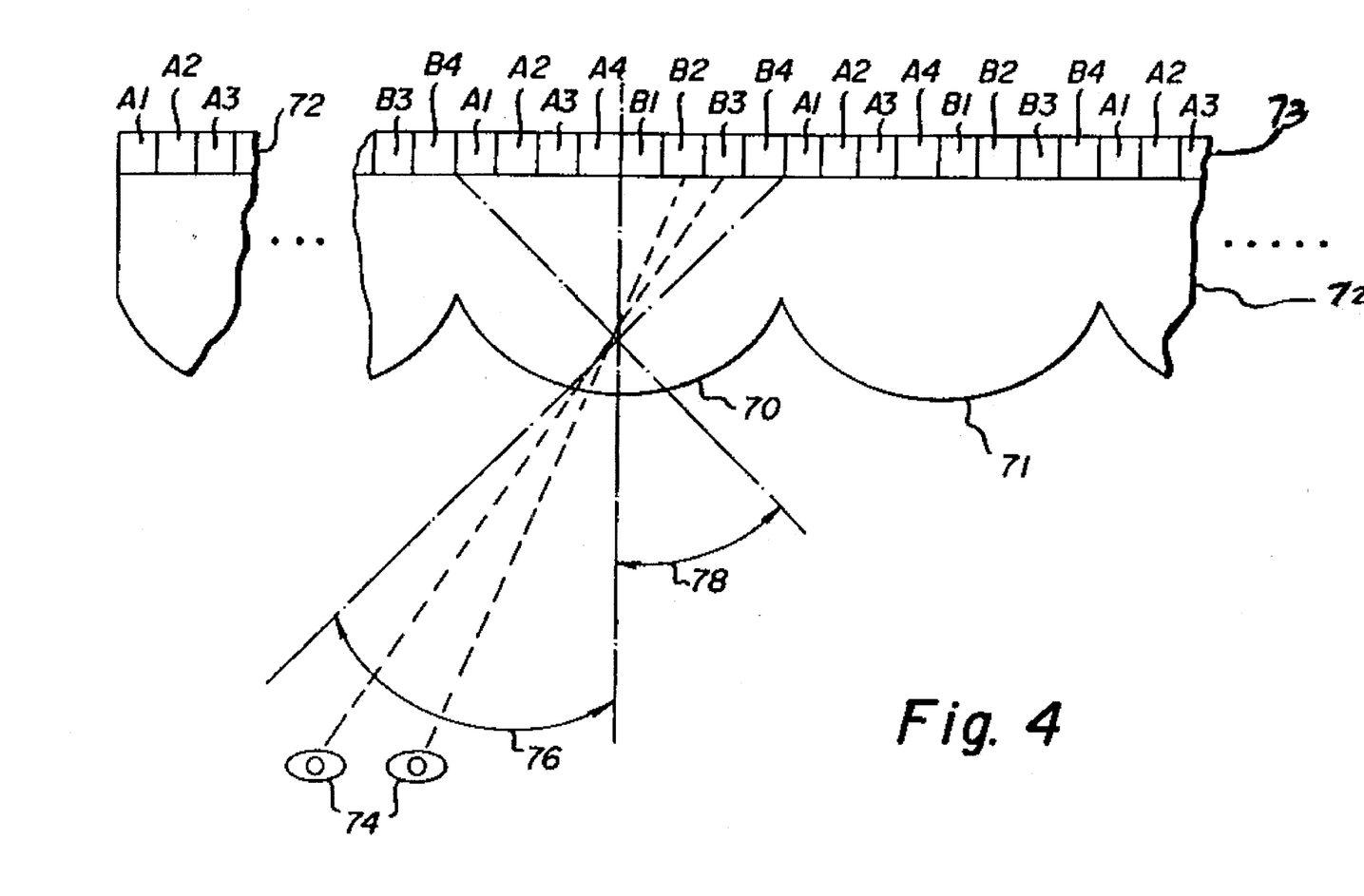
FIG. 4 depicts the interleaving of two different depth images on a substrate 73.

To provide the different scenes to the viewer from the different view orientations, the view slices from the different scenes and perspectives must be interleaved with respect to a lenticule 70 of lenticular faceplate 72 as illustrated in FIG. 4. This figure shows image slices from two different scenes A and B where each lenticule projects four perspective views 1–4 of each scene. The different scenes are recorded in different regions of the substrate associated with each lenticule. A first slice A1 from a first perspective of the A scene is positioned in the substrate or recording media 73 adjacent to a second slice A2 from a second perspective and so on until a fourth slice A4 of the A scene is positioned adjacent to a first slice B1 of scene B. The perspective slices of scene B are also successively positioned adjacent to one another in like manner. As can be seen the pattern of writing image slices is repeated in the adjacent lenticule 71. When the viewer's eyes 74 are positioned within angular view space 76 the viewer sees the B scene and when the viewer's eyes are in the view space 78 the viewer sees scene A. As depicted by the dashed lines the viewer's eyes 74 in angular view space 76 see different ones of the perspective slices preserving binocular stereopsis or image depth. In this example the eyes 74 see slices B3 and B2. When the viewer's eyes are positioned such that one eye is in space 76 and the other eye is in space 78 the viewer will see both scenes at the same time. As can be readily seen as the viewer's eyes move from left to right starting out on the far lefthand side of space 76 and ending up on the far righthand side of space 78, the viewer will see the scene B from several different perspectives, see a mixture of scene B and A and then see scene A from several different perspectives. The interleaving of different perspectives of a scene with the perspectives of a different scene as shown in FIG. 4 allows the viewer to see different scenes from different view orientations while the depth of each scene is preserved. If the red and green can graphics of FIG. 3 are the scenes A and B used to record the slices of FIG. 4 as the viewer moves from left to right the viewer will first see a green can 58, then a green/red can, depending on which eye of the viewer is dominant and then a red can 66 while seeing the other objects 54 and 56 in a depth relation thereto.

Figure 5:
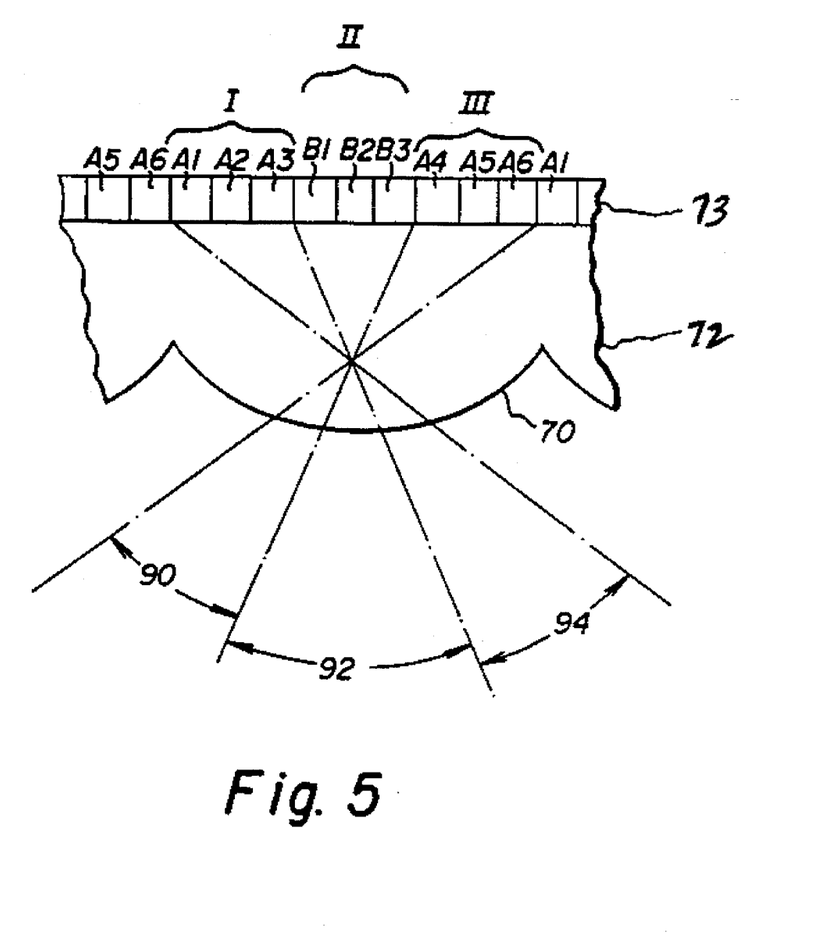
FIG. 5 illustrates interleaving of two different depth image scenes with one being projected toward the center and the other being projected to either side.

When the three different view series of FIG. 3 are interleaved to provide a view of scene B in the center and views of scene A on either side an interleaved arrangement as depicted in FIG. 5 results. As depicted three angular view spaces 90, 92 and 94 are created. In space 90 the viewer will see a rightward perspective series of scene A, in space 92 a frontal perspective series of scene B and in space 94 a leftward perspective series of scene A. Because each series I, II or III includes at least two view slices from each scene taken from different angular perspectives or viewpoints, binocular stereopsis or the perception of depth is preserved. Because this particular example includes at least three slices from the same scene in each scene series, look around capability is preserved. By providing more than three slices from each scene additional look around capability is provided and realism is enhanced for each of the scenes projected. It will be recognized by those of skill in the art that the series I, II, and III of figure 5, instead of projecting scenes of different cans 58 and 66, could each project different scenes, such as series I projecting a picture of a mountain, series II projecting a picture of a beach and series III projecting a picture of a plain. Using the printing technology commercially available today along with commercially available lenticular faceplates those of ordinary skill in the art can record at least twenty-four slices behind each lenticule of a fifty-two lenticule per inch faceplate. As a result, it is possible to record from two to eight different scenes behind each lenticule and preserve look around capability and record from two to twelve different scenes while preserving stereopsis or the perception of depth.

Figure 6:
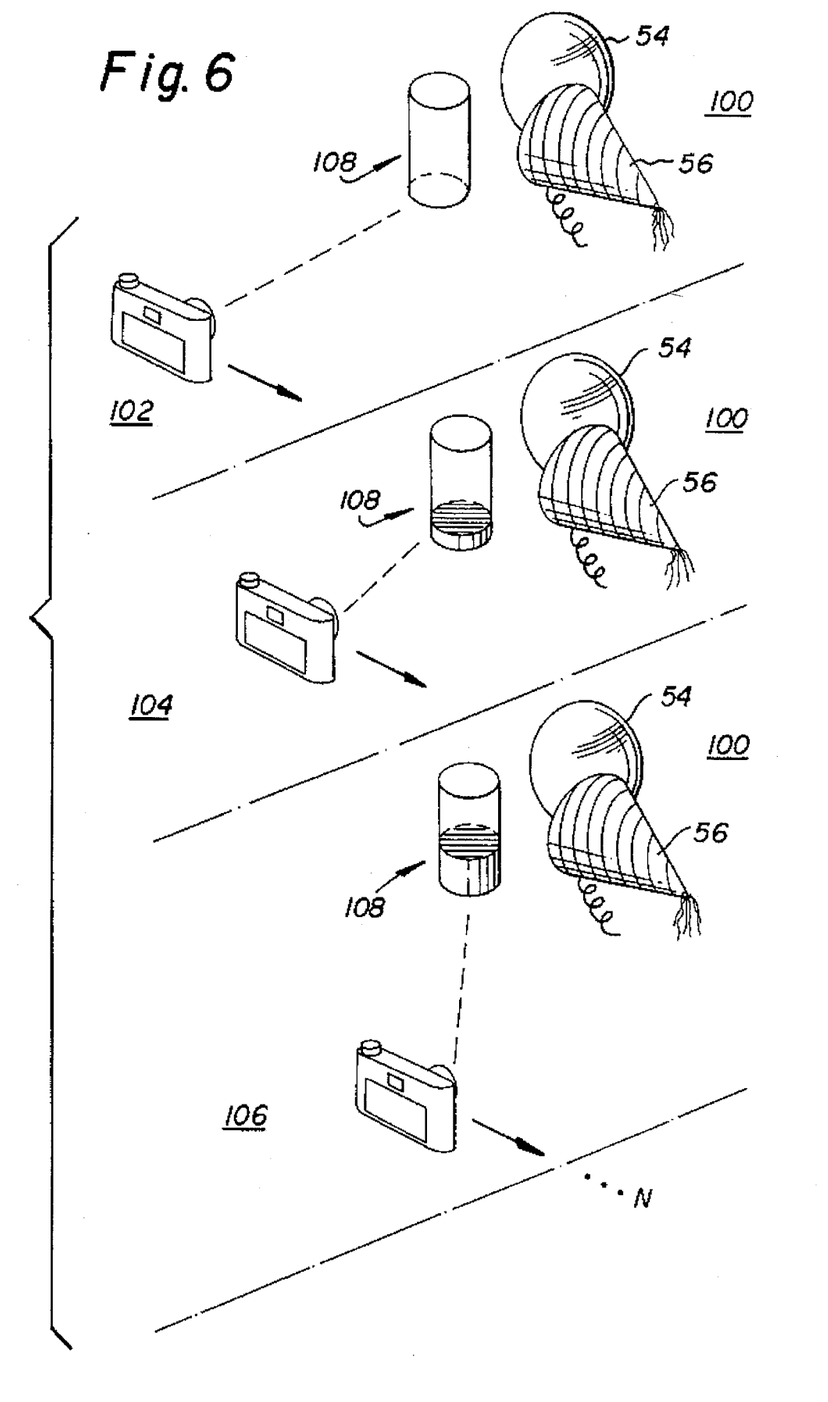
FIG. 6 depicts the capture of scene animation while preserving the perception of depth.

In addition to projecting different scenes to the viewer while preserving stereopsis and/or look around capability, the present invention allows look around capability to be provided along with image animation. To provide this feature, as illustrated in FIG. 6, the same scene 100 is captured or created from different perspectives 102, 104, 106 . . . while an object 108 in the scene changes. FIG. 6 illustrates a level of liquid in a transparent container 108 changing as the perspective shifts while other objects in the scene 100, such as the balloon 54 and the hat 56 remain the same. If the creator wants to present the maximum effect in such changing content perspective images it is best to position the changing object in the foreground.

Figure 7:
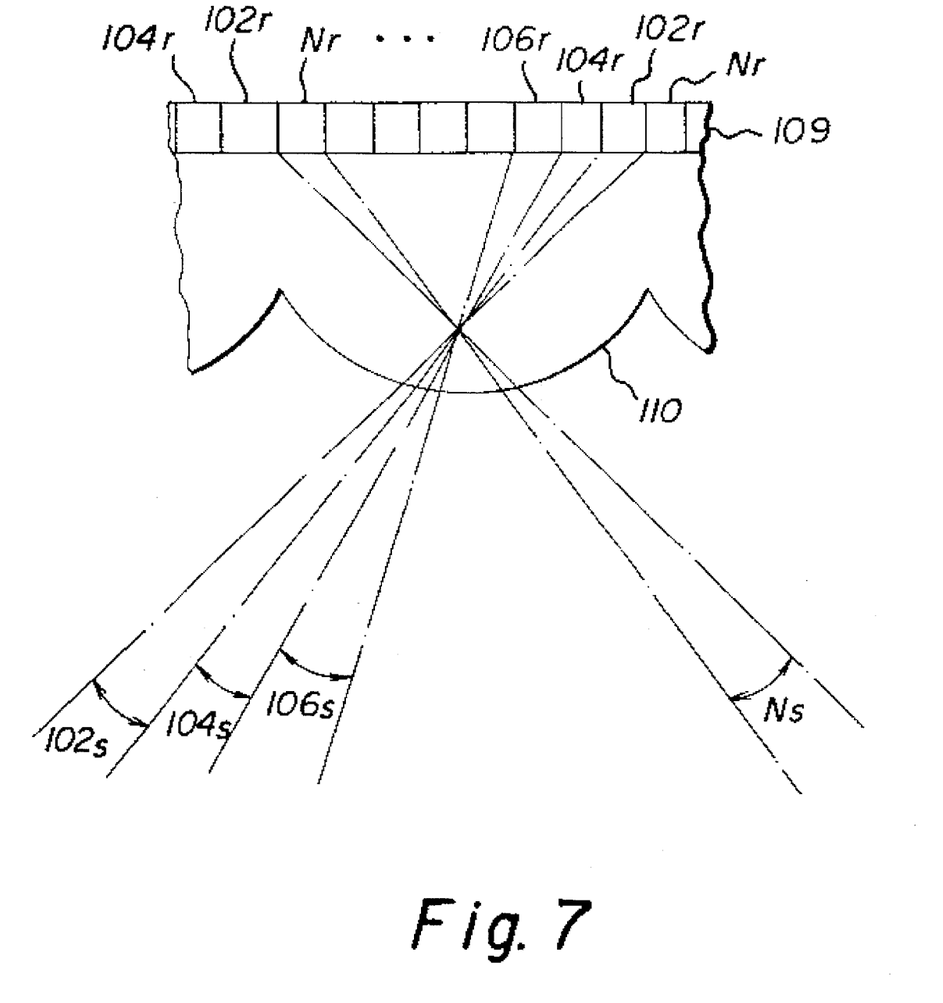
FIG. 7 illustrates interleaving perspectives to provide animation.

The recorded slices $102_r$, $104_r$, $106_r$, . . . $N_r$ of the perspectives of the captured images of FIG. 6 are interleaved on the recording medium 109 with respect to each lenticule 110 as shown in FIG. 7. The interleaving produces corresponding angular view spaces $102_s$, . . . , $N_s$. Because the information in the scene from perspective to perspective, other than the changing information, remains the same and is scenically related, the sense of depth is preserved for the viewer even though some of the scene information changes. At the same time because the viewer has a dominant eye the viewer ignores the conflicting information being seen by the non-dominant eye and when the eyes move from space to space the scene appears to be animated.

Figure 8:
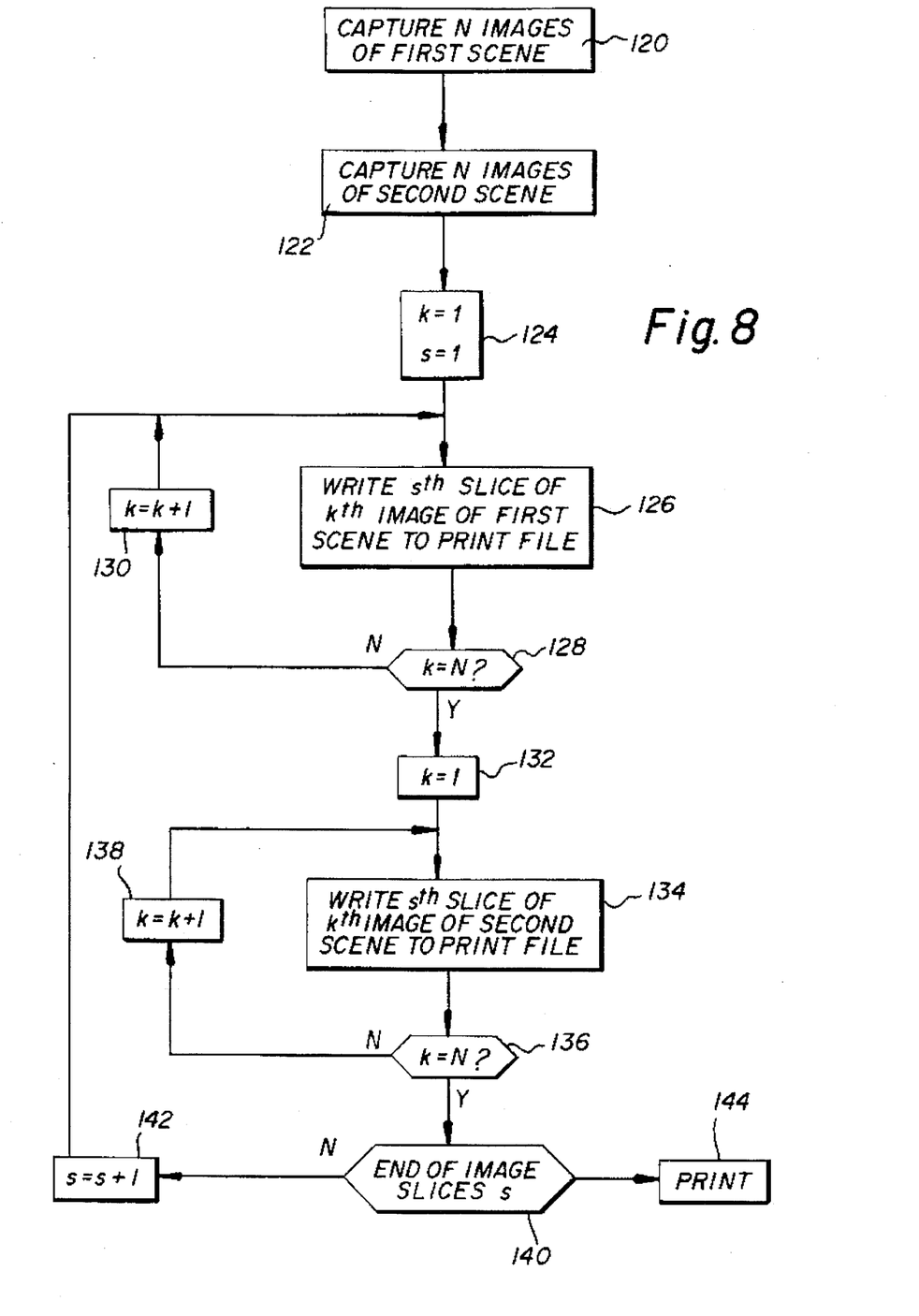
FIG. 8 is a flowchart of the steps of creating a print file for two scenes where depth is preserved by when a lenticular photograph is created using the print file.

FIG. 8 depicts the steps performed in capturing and combining two depth images with different content into a single depth image in which the scene information changes depending on viewer orientation such as described with respect to FIGS. 3 and 4. From the description of interleaving provided with respect to this figure a person of skill in the art can create the appropriate process for combining more than two scenes animation, etc. as described herein.

The first operation is to capture 120 and 122 the appropriate number of images of the scenes. For example, if the two scenes are being used with the commercially available printer and faceplate technology twelve perspectives of each scene would be captured. Next, pointers for the images (k) and slices (s) of the images are set 124. The process then enters a loop in which a slice of each perspective image of the first scene is written 126 to the print file. This corresponds to writing slices A1–A4 under lenticule 70 of FIG. 4. After each image slice is written the image pointer is tested 128 to determine whether the last image has been written. If not the pointer is updated 130 and the loop continues. When the designated slice from all the images of the first scene have been written to the print file the image pointer is reset 132 and the process enters a loop where the designated slice from the images of the second scene are written 134 to the print file. This loop corresponds to writing. slices B1–B4 under lenticule 70 of FIG. 4. The steps 134, 136 and 138 of this loop are the same as in the first loop except the source of the designated slice is the second scene. Once the designated slice from the perspective images of the two scenes has been written to the print file the slice pointer is tested 140 and if the end has not been reached the slice pointer is updated 142. This corresponds to the operation of moving the printer to print under the next lenticule 71 of FIG. 4. Once all the slices have been written to the print file the print file is used to drive 144 the printer to successively record the slices of the scenes in the recording medium.

The present invention has been described with respect to providing different scenes within a depth image. It will be recognized by those of skill in the art that graphics or text information can be substituted for the scene information. For example, the image of text describing a scene can be substituted for the B1–B3 slices shown in FIG. 5, thereby projecting a text image to the viewer in space 92. The text could be planar or depth text. Of course it is possible to substitute a text or graphics image for either or both of the image sets A or B of FIG. 4. It is also possible to provide attention getting features in the lenticular photograph. For example, by substituting a solid, bright, single color, separator slice or band for either or both of slices A4 and B1 of FIG. 4, the viewer will experience a bright image flash in the transition from space 76 to space 78. By making the separator band a color that is complimentary to the scene background colors, an effect of turning the images on-off-on can be created for the viewer as the viewer moves between spaces. The separator band can also be provided at the edge of the lenticule, such as by making slices B4 and A1 of FIG. 4 solid. The separator band can also be patterned as a depth image in some way that will get the attention of the viewer as the viewer moves through the view spaces. Of course the separator band could be a planar image. Text can suddenly appear to be superimposed on or flashed on top of the depth image (subliminally) if a single slice within each lenticule presents the text image to the viewer. If a live subject is used as the changing object in the perspectives of FIGS. 6 and 7 the subject will be perceived as in motion. For example, if the subject gradually closes and opens one eye from perspective to perspective in these figures, as the viewer moves from space to space the subject will appear to be winking. The scene images can be made to appear to fade in and out by varying the intensity that the slices are printed. For example, if the slices A1, A4, B1 and B4 of FIG. 4 are printed with less intensity than the other slices the scenes will appear to fade in and out as the viewer moves from view space to view space. The same fading can also be provided to graphics overlays that are superimposed on the depth images allowing the viewer to see a gradually emerging graphic on top of a depth image as the viewer moves from side to side through the spaces.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A depth image apparatus, comprising:
   a depth image projection mechanism; and
   an image substrate including at least two depth images each having a depth content and different scene content unrelated to the depth content and projected to different viewing spaces.

2. An apparatus as recited in claim 1, wherein said mechanism comprises one of a lenticular faceplate and a barrier strip faceplate.

3. An apparatus as recited in claim 1, wherein the different scene content comprises an object in the scene being different.

4. An apparatus as recited in claim 1, wherein the different scene content comprises an object in the scene varying.

5. An apparatus as recited in claim 1, wherein the different scene content comprises different scenes.

6. An apparatus as recited in claim 1, wherein the different scene content comprises a scene and one of a graphics image and a text image.

7. An apparatus as recited in claim 1, wherein the different scene content comprises two different scenes.

8. A depth image apparatus, comprising:
   a lenticular faceplate comprising lenticules; and
   a recording medium substrate confronting said lenticular faceplate, said recording medium associated with each of the lenticules being divided into first and second perspective series recording regions, each of the regions recording a series of perspective slices of different scenes each having a depth content and different scene content unrelated to the depth content and the lenticules projecting the perspective slices of the different scenes into first and second viewer spaces where the viewer's eyes at the time of being positioned in one of the first and second spaces perceive different ones of the slices producing binocular stereopsis perception of the one of the scenes in the viewer.

9. A method of creating a depth image, comprising:
   capturing different scene content depth images each having a depth content where the different scene content is unrelated to the depth content; and
   combining the different content depth images into a single depth image projecting the different content to different view spaces.

10. A method as recited in claim 9, wherein said combining comprises:
    recording perspective slices of a first scene successively on a recording medium; and
    recording perspective slices of a second scene successively on the recording medium after the first scene perspective slices are recorded.

* * * * *